United States Patent [19]
Focke et al.

[11] Patent Number: 4,753,384
[45] Date of Patent: Jun. 28, 1988

[54] HINGE-LID PACK FOR CIGARETTES OR THE LIKE

[75] Inventors: Heinz Focke; Kurt Liedtke, both of Verden, Fed. Rep. of Germany

[73] Assignee: Focke & Co., Verden, Fed. Rep. of Germany

[21] Appl. No.: 855,571

[22] Filed: Apr. 25, 1986

[30] Foreign Application Priority Data

May 2, 1985 [DE] Fed. Rep. of Germany ....... 3515775
Jun. 25, 1985 [DE] Fed. Rep. of Germany ....... 3522614

[51] Int. Cl.⁴ .............................................. B65D 5/66
[52] U.S. Cl. ................................. 229/160.1; 229/106; 206/271; 206/273
[58] Field of Search ............... 206/265, 268, 271, 273; 229/16 A, 44 CB, 106, 160.1; 493/910, 911

[56] References Cited

U.S. PATENT DOCUMENTS 3,944,066 3/1976 Niepmann .......................... 206/273
4,020,988 5/1977 Kipp ................................. 229/16 A
4,349,345 9/1982 Bodendoerfor .................... 493/295
4,466,536 8/1984 Zeitel ................................. 229/87 C

FOREIGN PATENT DOCUMENTS 654558 12/1962 Canada ............................ 229/44 CB
58760 5/1941 Denmark .......................... 229/44 CB
1008196 5/1957 Fed. Rep. of Germany ... 229/44 CB
2334190 1/1975 Fed. Rep. of Germany ...... 206/268
2940797 4/1981 Fed. Rep. of Germany .
596645 1/1948 United Kingdom ........... 229/44 CB
1338689 11/1973 United Kingdom ................ 206/268
2011353 7/1979 United Kingdom ........... 229/44 CB
2032394 5/1980 United Kingdom ................ 206/268

Primary Examiner—David T. Fidei
Attorney, Agent, or Firm—Sughrue, Mion, Zinn, Macpeak & Seas

[57] ABSTRACT

Hinge-lid packs for cigarettes or other pack contents are very expensive in respect of material consumption. A saving of material is achieved as a result of bevelled longitudinal edges (26,27) and lid longitudinal edges (28,29), while preserving the storage capacity, because, in particular, side tabs (31,32) and lid side tabs (33,34) of the side wall (13) and of the lid side wall (18,19) are made with less width and hence save material.

4 Claims, 5 Drawing Sheets

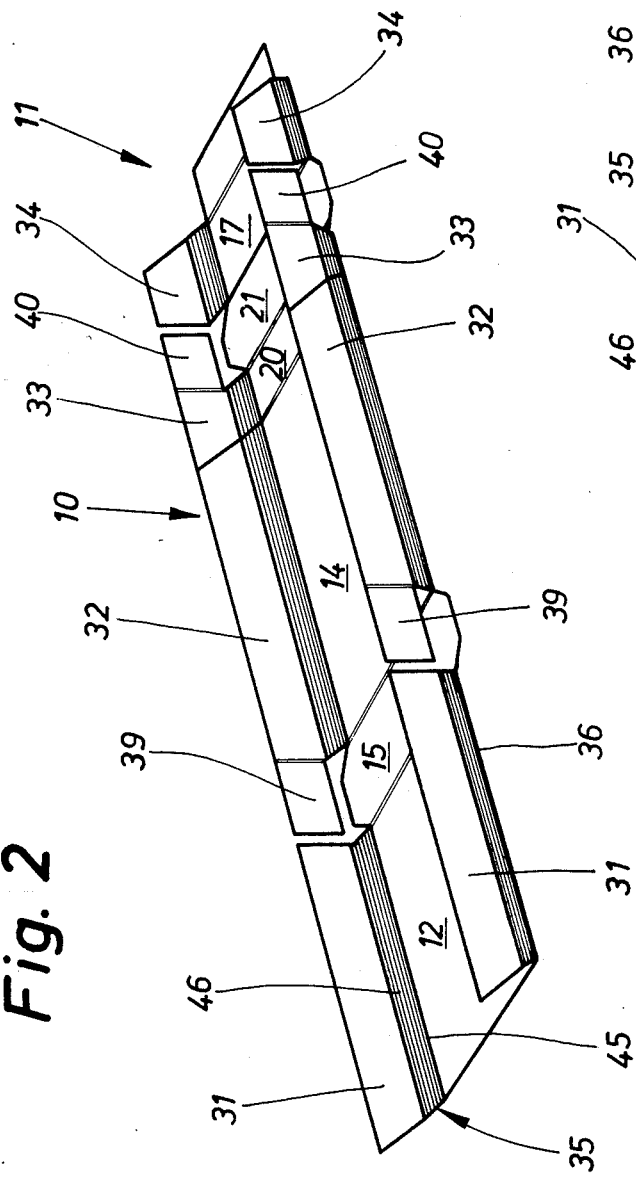
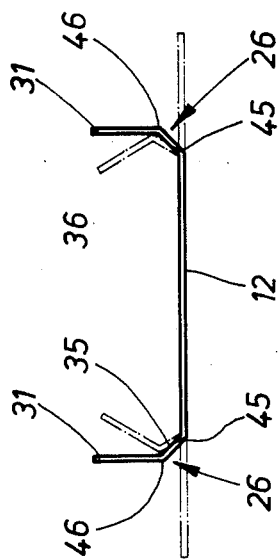

HINGE-LID PACK FOR CIGARETTES OR THE LIKE

BACKGROUND OF THE INVENTION

The invention relates to a hinge-lid pack consisting of foldable material, such as cardboard or the like, of essentially cuboid shape, especially for receiving a cigarette group wrapped in an inner blank (tin-foil block), with a pack part and with a hinge lid which is articulated on a rear wall of the latter and which, in the closed position, surrounds a collar connected to the pack part.

The term "hinge-lid pack" is also used for this type of pack. Because of the relatively firm packaging material (thin cardboard), packs of this type are relatively stable dimensionally. Longitudinal and transverse edges of the hinge-lid pack for the limitation of walls have hitherto been sharp without exception. This is also one reason for the considerable outlay in terms of material for this type of pack which is popular in practice.

SUMMARY OF THE INVENTION

The object on which the invention is based is to construct a hinge-lid pack of the type mentioned in the introduction, whilst at the same time preserving the constructive design and functionality, in such a way that the outlay in terms of material is reduced in comparison with conventional hinge-lid packs.

To achieve this object, the hinge-lid pack according to the invention is characterised in that (vertical) longitudinal edges of the pack part, of the hinge lid and of the collar are designed bevelled, while being adapted to suit the diameter of the cigarettes, in a manner such that the hinge-lid pack has an octagonal equiangular cross-section.

The bevelled longitudinal edges result in a saving of material, in the first place because the hinge-lid pack matches the outer contour of the pack content, in particular the cigarette group, closely and virtually positively.

Furthermore, a saving of material is achieved by making inner and outer side tabs and lid side tabs with less width than in conventional hinge-lid packs. To form side walls and lid side walls, these narrower side tabs and lid side tabs rest against one another only in the region outside the bevel of the longitudinal edges.

However, another advantage is the handling of the pack, since it can be grasped more comfortably because of the bevelled longitudinal edges.

According to a further proposal, the collar is equipped, in the region of the bevel, with a locking tongue formed by stamping, which projects slightly beyond the lateral contours of the collar and which, in the closed position of the hinge lid, engages behind an edge of the inner lid side tab. To open the hinge-lid pack by swinging the hinge lid back, the locking tongue is deformed so that the lid can be actuated in the usual way.

Further features of the invention relate to the design of the hinge-lid pack and to its manufacture.

BRIEF DESCRIPTION OF THE DRAWING

Exemplary embodiments of a hinge-lid pack are explained below with reference to the drawings. In the drawings:

FIG. 2 shows, likewise in perspective, a blank for a hinge-lid pack according to FIG. 1, in an intermediate folded position, FIG. 3 shows a cross-section through the blank according to FIG. 2.

DESCRIPTION OF THE PREFERRED EMBODIMENT

The hinge-lid pack shown, made of thin paperboard or thin cardboard, serves for receiving cigarettes, in particular a cigarette group which is wrapped in an inner blank, especially a tin-foil blank (not shown). The approximately cuboid tin-foil block fits positively into the hinge-lid pack.

Figure 1:
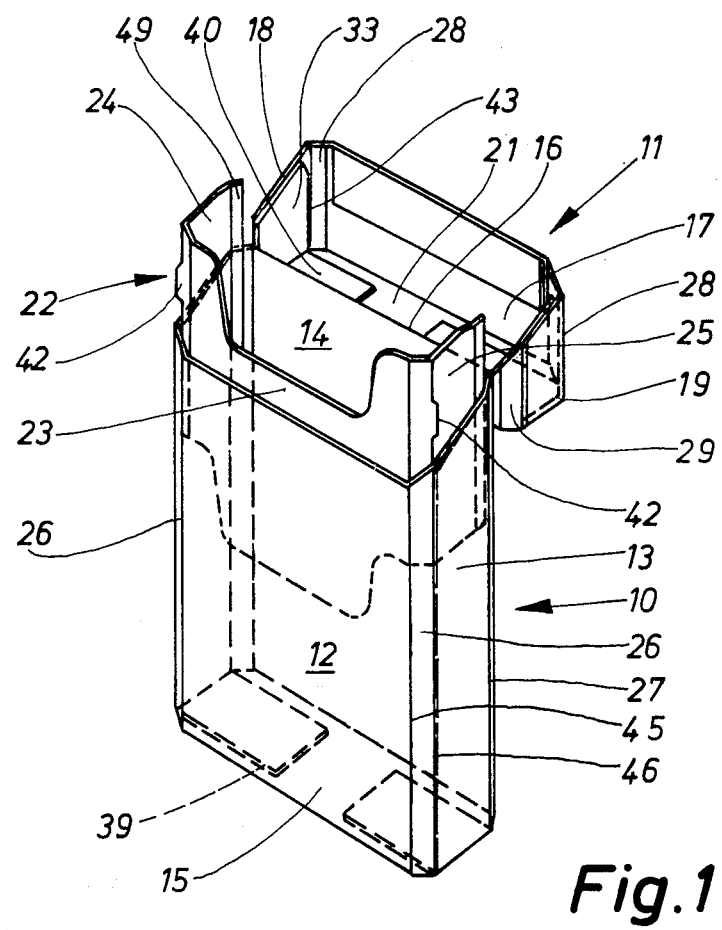
FIG. 1 shows a perspective representation of a hinge-lid pack with bevelled longitudinal edges.

According to FIG. 1, the hinge-lid pack consists of a pack part 10 and a hinge lid 11. The former is formed by a front wall 12, side walls 13, a rear wall 14 and a bottom wall 15. The hinge lid 11 is connected to the rear wall 14 in the region of a hinge line 16.

In a similar way to the pack part 10, the hinge lid 11 consists of a lid front wall 17, lid side walls 18 and 19, a lid rear wall 20 (joined to the rear wall 14 of the pack part 10) and a lid top wall 21.

In keeping with the conventional design of a hinge-lid pack, a collar 22, consisting of a collar front wall 23 and collar side walls 24 and 25, is inserted into the pack part 10. The lower part of the collar 22 is connected to the front wall 12 and to the side walls 13. An upper region projects from the pack part 10 and, in the closed position, is surrounded by the hinge lid 11.

Vertical longitudinal edges 26,27 of the pack part 10, lid longitudinal edges 28 and 29 in the form of extensions of these and front collar longitudinal edges 30 are bevelled, specifically in such a way that the pack rests, in a space-saving manner, closely against the pack contents, i.e. a tin-foil block (cigarette group wrapped in a tin-foil blank), in the region of the vertical longitudinal edges.

Figure 4:
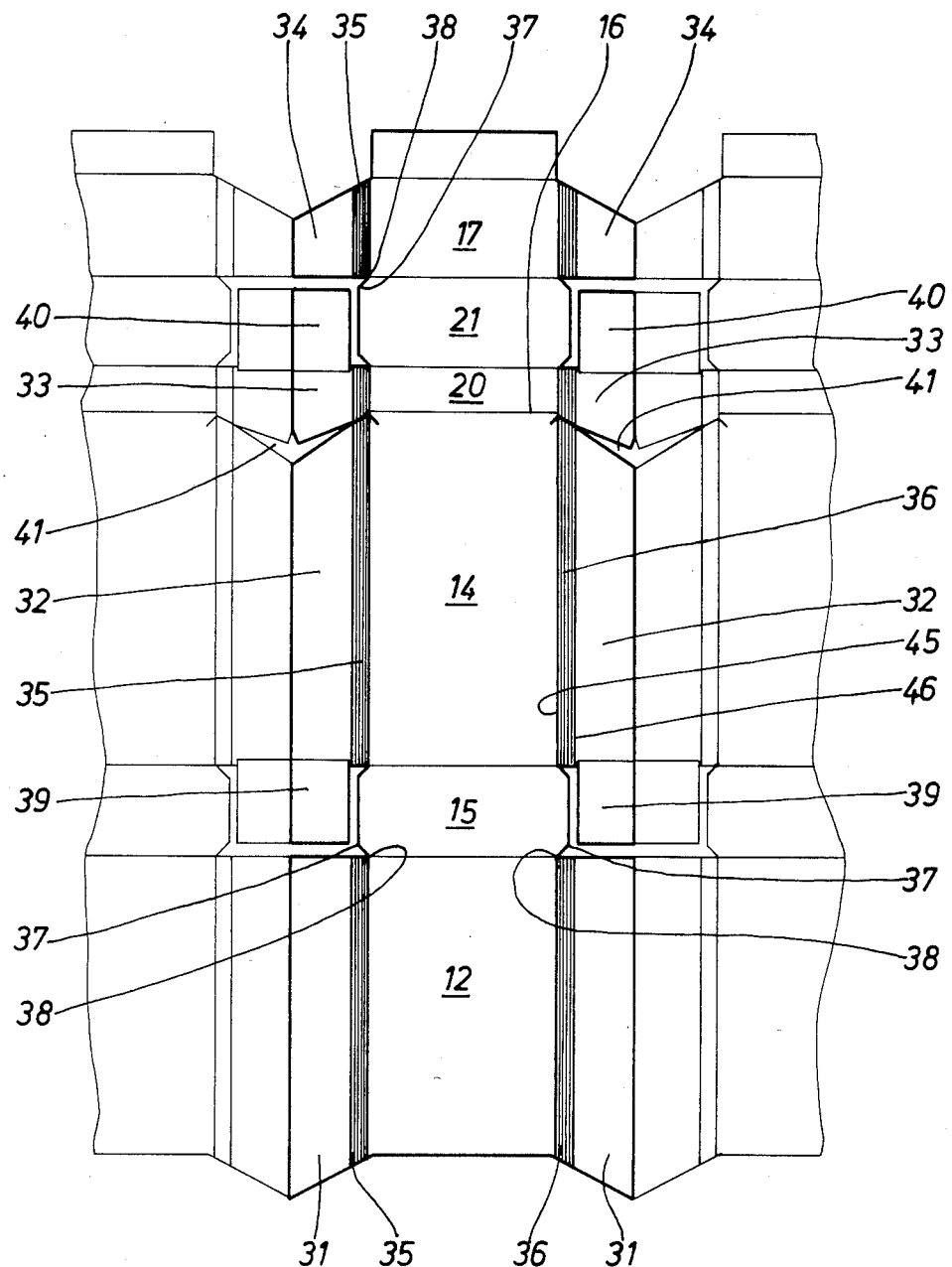
FIG. 4 shows the arrangement of blanks for a hinge-lid pack according to FIG. 1 within a continuous sheet of packaging material.

A hinge-lid pack having vertical longitudinal edges 26 to 29 bevelled in this way can be produced, for example, from a blank according to FIG. 4. In accordance with the side-closing principle of construction of the hinge-lid pack, the side walls 13 are formed by side tabs 31 and 32 overlapping one another. Appropriately designed lid side tabs 33 in the region of the lid rear wall 20 and lid side tabs 34 in the region of the lid front wall 17 are provided for the lid side walls 18 and 19. Between the side tabs 31 to 34, on the one hand, and the adjacent walls of the hinge-lid pack or blank (FIG. 4), there is a strip of material 35 or 36. The latter is folded over at the corner so that each longitudinal edge 26,27 or each lid longitudinal edge 28,29 is formed from two individual edges 45,46.

The side tabs 31,32 and lid side tabs 33,34 are consequently given a smaller width than the total width of the hinge-lid pack itself, in particular less the dimensions of the bevels or of the strip of material 35, 36. The side tabs 31 and 32 and lid side tabs 33 and 34 which are assigned to one another respectively overlap one another over their entire surface in the region between the individual edges 45,46.

The bottom wall 15 and the lid top wall 21 are designed with correspondingly bevelled corners, with formation of in each case two individual corners 37 and 38, which respectively fit positively against the bevelled longitudinal edges 26,27 and lid longitudinal edges 28,29 respectively at the bottom and top.

As is known in principle, the inner side tabs 32 and the likewise inner lid side tabs 33 have bottom corner tabs 39 and lid corner tabs 40 attached respectively to them. In the ready-folded hinge-lid pack, these rest against the inside of the bottom wall 15 and the lid top wall 21 respectively. In the present design of the hinge-lid pack, the bottom corner tabs 39 and the lid corner tabs 40 have less width than the total width of the hinge-lid pack, in particular are approximately as wide as the side tabs 32 and lid side tabs 33 between the adjacent individual edges 45,46.

Figure 5:
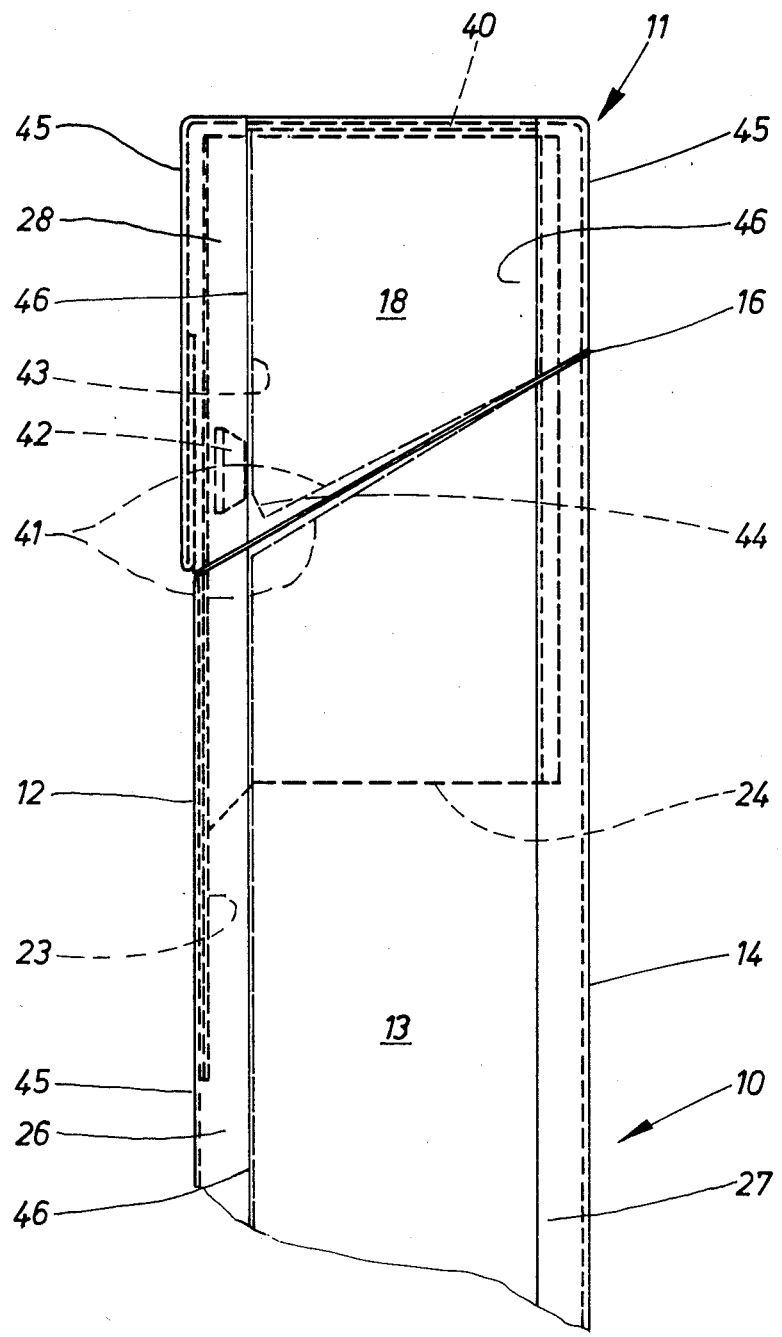
FIG. 5 shows a side view, on an enlarged scale, of the upper part of the hinge-lid pack in the closed position.
Figure 6:
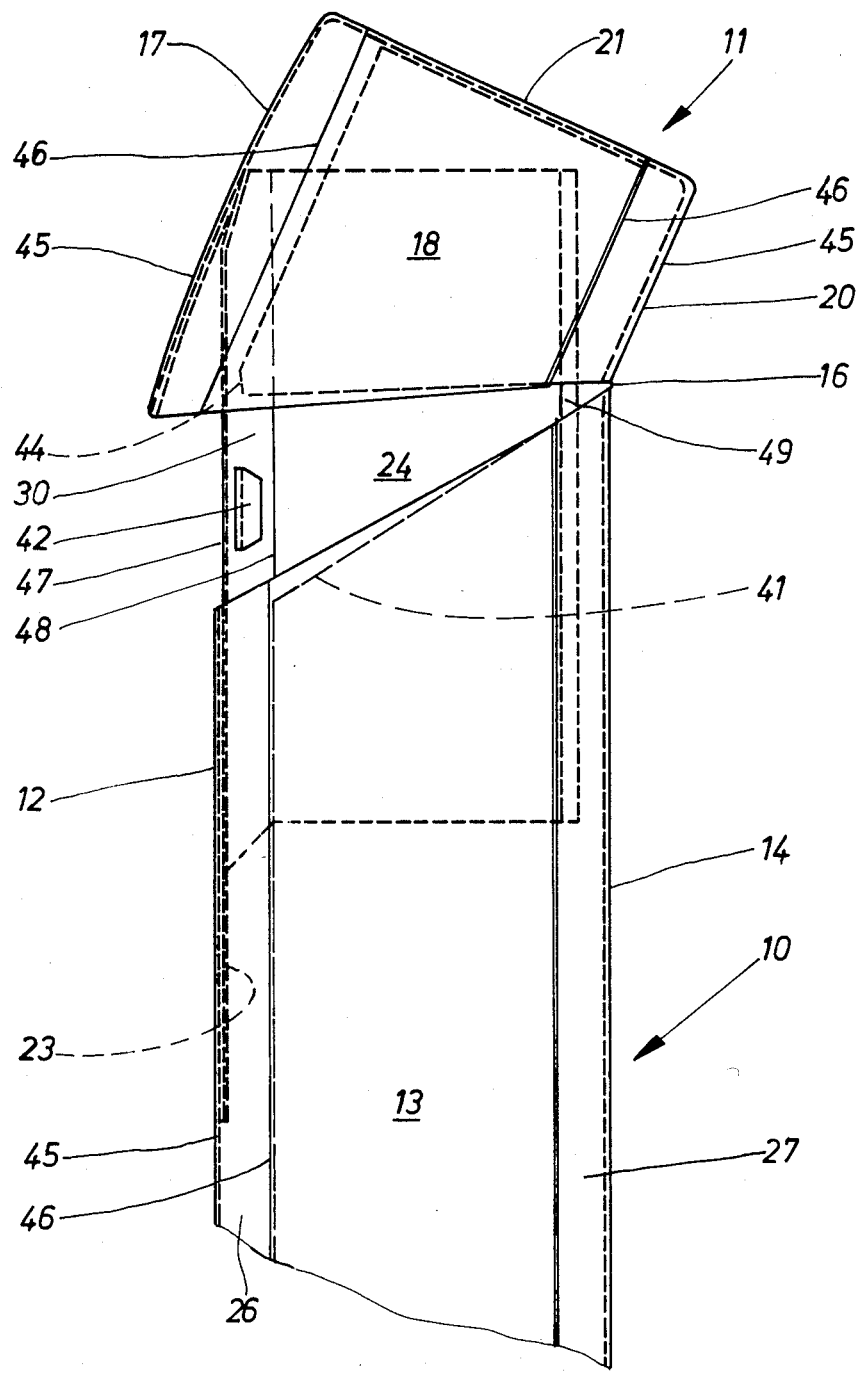
FIG. 6 shows a representation corresponding to that of FIG. 5 during an opening phase of the hinge lid.

Furthermore, in the present case, a wedge-shaped stamping 41 between the innerside tabs 32 and lid side tabs 33 ensures that these spring back upwards and downwards relative to the associated outer side tabs 31 and lid side tabs 34 respectively (FIGS. 5 and 6). As a result of this offset between the inner and outer side tabs 31 to 34, any inexact relative positions between the side tabs resting against one another are compensated.

The hinge-lid pack is provided with a locking means for securing or stabilising the closed position of the hinge lid 11. For this purpose, the collar 22 is provided in the lateral region, in particular in the region of the collar longitudinal edges 30, with a locking tongue 42 which, in the operative position, projects slightly beyond the contours of the collar 22. The locking tongue 42 is formed by an approximately U-shaped stamping in the region of the transition between the collar side wall 24,25 and the collar front wall 23. The locking tongue 42 which is obtained and projects in this way is in a position in which, when the hinge lid 11 is closed, a front edge 43 of the inner lid side tab 33 engages behind the locking tongue 42 or is stressed by the latter towards the closed position. To open the hinge-lid pack, the hinge lid 11 is pivoted in the usual way, the front edge 43 of the lid side tab 33 at the same time overcoming the retaining force exerted by the locking tongue 42. To make this opening action easier, according to FIGS. 5 and 6 a bevel 44 is formed in the region of the bottom front corner of the inner lid side tab 33.

In the manufacture of a hinge-lid pack of the present design with polygonal longitudinal edges 26 to 29, the procedure, according to FIGS. 2 and 3, is first to preform the elongate one-piece blank as regards the bevels of the longitudinal edges 26 to 29. The blank thereby acquires an essentially U-shaped form in cross-section. At the same time, the raised side tabs are deformed so far inwards that they assume a vertical position as a result of the restoring forces. After the bevelled longitudinal edges 26 to 29 have been formed, the blank is delivered for further folding and filling.

Figure 7:
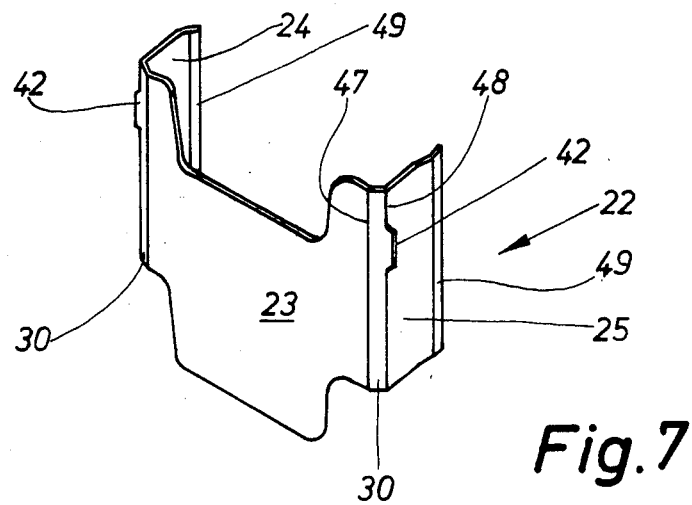
FIG. 7 shows, likewise in a perspective representation, a collar as a detail of the hinge-lid pack according to FIG. 1.

Design details of the collar 22 can be found in FIG. 7. The collar longitudinal edges 30 are bevelled so that collar individual edges 47,48 corresponding to the pack part 10 are formed. Moreover, an edge strip 49 is attached in an angled manner to each rear wall of the collar side walls 24,25, in particular with adaptation to the rear, bevelled longitudinal edges 27 or lid longitudinal edges 29. The angled-off edge strip 49 provides the collar with greater dimensional stability.

We claim:

1. Hinge-lid pack consisting of foldable material, such as cardboard or the like, of essentially cuboid shape, especially for receiving a cigarette group wrapped in an inner blank, with a pack part and with a hinge lid which is articulated on a rear wall of the latter and which, in the closed position, surrounds a collar connected to the pack part, characterized in that vertical longitudinal edges (26,27; 28,29; 30) of the pack part (10), of the hinge lid (11) and of the collar (22) are designed bevelled, while being adapted to suit the diameter of the cigarettes, in a manner such that the hinge-lid pack has an octagonal equiangular cross-section; in that a bottom wall (15) and a lid top wall (21) with bevelled corners (individual corners 37,38) fit flush and positively against the associated walls in accordance with the bevel of the longitudinal edges (26 to 29) without being connected to these; and in that side walls (13) and lid side walls (18, 19) are formed respectively from side tabs (31,32) and lid side tabs (33,34) which lie on top of one other and the width of which is such that they overlap one another alternatively only in the region between the adjacent individual edges (45,46) of the longitudinal edges (26 to 29); and further characterized in that bottom corner tabs (39), adjoining the inner side tabs (32), and lid corner tabs (40), adjoining the inner lid side tabs (33), are made with less width than the width of the bottom wall (15) and lid top wall (21), respectively, and have a width approximately equal to the width of the side tabs (31) and lid side tabs (33) between the individual edges (45,46) of the longitudinal edges (26 to 29).

2. Hinge-lid pack according to claim 1, characterised in that inner side tabs (31) and lid side tabs (33) are at such a distance from one another, as a result of wedge-shaped (double) stamping (41), that top and bottom edges of the inner side tabs (31) and of the lid side tabs (33) are respectively set back in a wedge-shaped way relative to the edges of the outer side tabs (32) and lid side tabs (34).

3. Hinge-lid pack, in particular according to claims 1 or 2 characterised in that the collar (22) has, in the lateral front region, a locking tongue (42) which is formed by a U-shaped or trapezoidal stamping, is directed, in the initial position, toward the rear wall (14) and the lid rear wall (20) and which, in the closed position, rests against an edge facing the lid front wall (17) of the hinge lid (11), in particular against a vertical front edge (43) of the inner lid side tab (33).

4. Hinge-lid pack according to claim 3, characterised in that the locking tongue (42) is arranged in the region of the bevel of the collar longitudinal edge (30), adjacent to the upper region of the pack part (10).

* * * * *